United States Patent [19]

Soeda et al.

[11] 4,168,455

[45] Sep. 18, 1979

[54] MOTOR SPEED CONTROL SYSTEM

[75] Inventors: Katsuji Soeda; Fumio Sakuma; Mitsuhiro Ooyama, all of Sukagawa, Japan

[73] Assignee: Yamamoto Electric Industrial Co., Ltd., Fukushima, Japan

[21] Appl. No.: 811,625

[22] Filed: Jun. 30, 1977

[30] Foreign Application Priority Data

Jul. 5, 1976 [JP] Japan ................................ 51-79589

[51] Int. Cl.² .............................................. H02P 5/00
[52] U.S. Cl. ................... 318/331; 318/345 D; 318/317
[58] Field of Search ............... 318/331, 345 D, 345 C, 318/345 CA, 311, 312, 317, 315; 324/158 MG

[56] References Cited

U.S. PATENT DOCUMENTS

| 3,384,802 | 4/1968 | Shrider et al. | 318/331 |
| 3,414,791 | 12/1968 | Munson et al. | 318/331 |
| 3,523,234 | 8/1970 | Turtle | 318/345 D |
| 3,586,947 | 6/1971 | Ilk et al. | 318/331 |
| 4,069,446 | 1/1978 | Yonehara | 318/331 |

Primary Examiner—Gene Z. Rubinson
Assistant Examiner—M. K. Mutter
Attorney, Agent, or Firm—Armstrong, Nikaido, Marmelstein & Kubovcik

[57] ABSTRACT

A speed control system for a motor comprising a main motor circuit supplying motor current to the motor from an A.C. power source through a semiconductor element provided with a control electrode, trigger voltage supplying means supplying trigger voltage to the control electrode of the semiconductor element, motor voltage detecting means for detecting voltage induced in the motor, and automatically variable resistance means having its resistance value varied automatically depending on the detected motor voltage. In the system, the trigger voltage supplied by the trigger voltage supplying means is controlled depending on the variation in the resistance value of the automatically variable resistance means, and the firing angle of the semiconductor element is retarded in response to an increase in the detected motor voltage and advanced in response to a decrease in the detected motor voltage.

3 Claims, 2 Drawing Figures

MOTOR SPEED CONTROL SYSTEM

BACKGROUND OF THE INVENTION

This invention relates to motor speed control systems, and more particulary to a speed control system applied to a motor of small size for minimizing speed variation due to load variation occurring during rotation of the motor at low speeds.

A speed control system for a series commutator motor is known in which a semiconductor element provided with a control electrode is disposed in the path of motor current supplied from an A.C. power source to the motor. In this known speed control system, a rectifier element is connected in parallel with the field winding of the commutator motor, and discharge current provided by the discharge of electrical energy accumulating in the field winding is used to excite the magnetic poles for increasing the electromotive force induced in the armature, thereby increasing the effect of feedback of the speed factor to the semiconductor element and improving the stability of speed control. A typical prior art speed control system of this kind is disclosed in U.S. application Ser. No. 261,099 entitled "Speed Control System for A.C. Series Commutator Motor," invented by Katsuji Soeda, filed June 8, 1972, issued Apr. 9, 1974 as U.S. Pat. No. 3,803,468, and assigned to the assignee common to the applicant of the present application.

Although the disclosed speed control system has been effective in improving the stability of speed control by increasing the electromotive force induced in the armature to increase the amount of feedback of the speed factor in the manner above described, occurrence of excessive load variation at low motor speeds has tended to give rise to considerable speed variation which is no more negligible. This phenomenon has been especially marked when a cam adapted to be incorporated in a motor-driven sewing machine is used to make pattern sewing on a fabric workpiece.

SUMMARY OF THE INVENTION

It is therefore a primary object of the present invention to provide a novel and improved speed control system for a motor of small size which obviates the aforementioned instability of speed control at low motor speeds.

In accordance with one aspect of the present invention attaining the above object, there is provided a speed control system for a motor comprising a main motor circuit supplying motor current to the motor from an A.C. power source through a main switch and a semiconductor element provided with a control electrode, trigger voltage supplying means for supplying trigger voltage to the control electrode of the semiconductor element, motor voltage detecting means for detecting voltage induced in the motor, and automatically variable resistance means having its resistance value automatically varied depending on the detected motor voltage, the trigger voltage supplied by the trigger voltage supplying means being controlled depending on the variation in the resistance value of the automatically variable resistance means, and the firing angle of the semiconductor element being retarded in response to an increase in the detected motor voltage and advanced in response to a decrease in the detected motor voltage.

It will thus be seen that, in the speed control system according to the present invention, the motor voltage is continuously detected, and the trigger voltage is controlled depending on the detected value of motor voltage so that the motor speed variation can be minimized regardless of excessive load variation.

The above and other objects, features and advantages of the present invention will become more apparent and will be easily understood from the following detailed description taken in conjunction with the accompanying drawing and also from appended claims.

DESCRIPTION OF THE PREFERRED EMBODIMENT

Before describing a preferred embodiment of the present invention in detail, description will be first directed to a typical motor speed control system to which the present invention is applied, so that the present invention can be more clearly understood.

Figure 1:
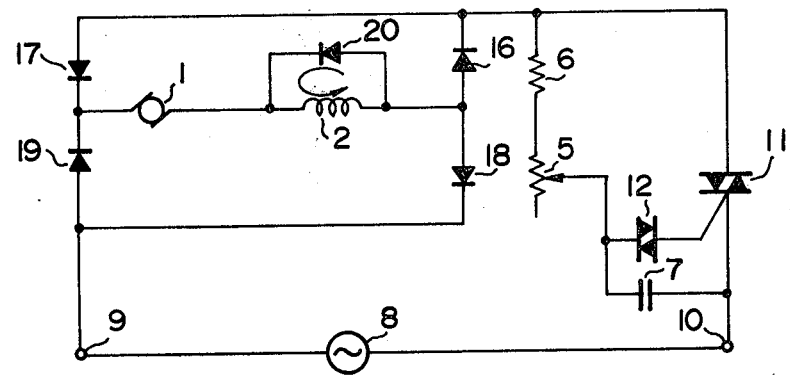
FIG. 1 is a circuit diagram of a typical, prior art speed control system for a series commutator motor.

FIG. 1 is a circuit diagram of a typical example of a speed control system for a commutator motor according to a senior application and shows actually a system disclosed in U.S. Pat. No. 3,803,468 referred to above. Referring to FIG. 1, one end of an armature winding 1 of a series commutator motor is connected to one end of a field winding 2 of the motor, and a pair of rectifier diodes, for example, silicon diodes 17 and 19 (abbreviated hereinafter as SR's) are connected at their cathodes to the other end of the armature winding 1. Another pair of SR's 16 and 18 are connected at their anodes to the other end of the field winding 2. The cathode of SR 18 and the anode of SR 19 are connected to one terminal 9 of an A.C. power source 8, while the anode of SR 17 and the cathode of SR 16 are connected to a second electrode of a bidirectional triode control element 11 whose first electrode is connected to the other terminal 10 of power source 8. A resistor 6 is connected at one end thereof to the second electrode of bidirectional control element 11 and at the other end thereof to one end of a variable resistor 5. The slide arm of this variable resistor 5 is connected to the first electrode of bidirectional control element 11 through a capacitor 7 and to a trigger electrode of bidirectional control element 11 through a diac 12. Another SR 20 is connected at its anode to the aforesaid other end of field winding 2 and at its cathode to the aforesaid one end of field winding 2.

Consider now the operation of the speed control system in a half cycle in which the terminals 9 and 10 of A.C. power source 8 are plus and minus respectively. (In this specification, a half cycle of power supply voltage in such a polarity is called a positive half cycle, and that in an opposite polarity is called a negative half cycle.) The bidirectional control element 11 is in its cut-off state in either direction before this positive half cycle starts. In the positive half cycle, current supplied from the power source 8 flows through the terminal 9, SR 19, armature 1, field winding 2, SR 16, resistor 6 and variable resistor 5 in the above order to charge the capacitor 7 until the terminal voltage of the capacitor 7 builds up to the breakdown peak voltage level of the diac 12. The diac 12 is turned on to trigger the gate of bidirectional control element 11 to turn on the same. Therefore, current continues to flow through the route which is traced from the power source 8—terminal 9, SR 19, armature 1—field winding 2, SR 16—bidirectional control element 11—terminal 10 to the power source 8 until the power supply voltage decreases to zero. At this time, the bidirectional control element 11 is turned off to stop the flow of motor current through the motor. The length of time required for the build-up of the terminal voltage of the capacitor 7 to the breakdown peak voltage level of the diac 12 can be adjusted by varying the resistance value of the variable resistor 5. In the negative half cycle following the positive half cycle, the capacitor 7 is charged in a direction opposite to that in the positive half cycle, and the diac 12 is turned on in the opposite direction to trigger the gate of bidirectional control element 11. Current flows now through the route which is traced from the power source 8—terminal 10—bidirectional control element 11—SR 17—armature 1—field winding 2—SR 18—terminal 9 to the power source 8.

It will thus be seen that the electromotive force induced in the armature by the residual magnetism in the magnetic poles during the non-conducting period of the bidirectional control element 11 is fed back to the gate of bidirectional control element 11 as the speed factor, so that the motor speed can be controlled to be constant regardless of any load variation. The electrical energy accumulating in the field winding 2 discharges in the direction of the arrow through the SR 20 as soon as the power supply voltage decreases to zero to turn off the bidirectional control element 11, and this discharge current excites the magnetic poles to increase the electromotive force induced in the armature, thereby increasing the amount of feedback of the speed factor and ensuring stable motor operation at the constant speed. The system shown in FIG. 1 is also advantageous in that full-wave rectified current is supplied to the motor to provide a large torque at low motor speeds and to prevent occurrence of noise. However, the speed control system shown in FIG. 1 has still had the defect that motor speed variation of considerable extent which is no more negligible tends to be encountered when excessive load variation occurs.

The speed control system according to the present invention which obviates such a defect is featured by the fact that the motor voltage is continuously detected, and the trigger voltage is controlled depending on the detected value of motor voltage.

Figure 2:
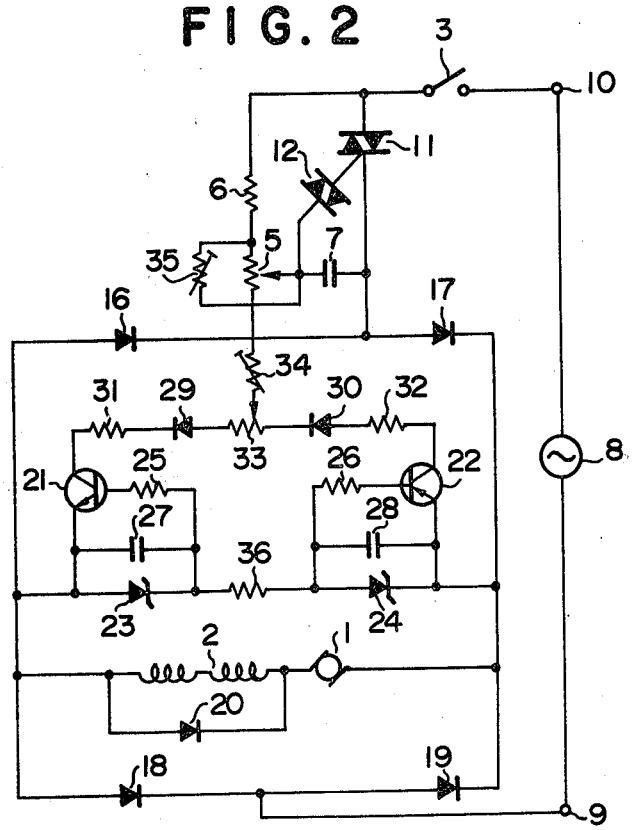
FIG. 2 is a circuit diagram of a preferred embodiment of the present invention.

FIG. 2 is a circuit diagram of a preferred embodiment of the motor speed control system according to the present invention. In FIG. 2, like reference numerals are used to designate like or equivalent parts appearing in FIG. 1 to dispense with repeated explanation of such parts. Thus, reference numerals 1, 2, 5, 6, 7, 8, 11 and 12 in FIG. 2 designate an armature winding and a field winding of a series commutator motor, a variable resistor, a fixed resistor, a capacitor, an A.C. power source having power supply terminals 9 and 10, a bidirectional control element, and a diac, respectively. Further, reference numerals 16, 17, 18, 19 and 20 in FIG. 2 designate SR's.

Referring to FIG. 2, a constant-voltage element, for example, a Zener diode 23 is connected at its anode to the anode of SR 18 and at its cathode to the anode of another constant-voltage element, for example, a Zener diode 24 through a resistor 36. The cathode of Zener diode 24 is connected to the cathode of SR 19. The Zener diode 23 is also connected at its anode to one end of a capacitor 27 and to an automatically variable resistance means, for example, the emitter of an NPN transistor 21. The Zener diode 23 is also connected at its cathode to the other end of capacitor 27 and to the base of transistor 21 through a resistor 25. The Zener diode 24 is also connected at its anode to one end of a capacitor 28 and to another automatically variable resistance means, for example, the base of a PNP transistor 22 through a resistor 26. The Zener diode 24 is also connected at its cathode to the other end of capacitor 28 and to the emitter of transistor 22. The transistor 22 is connected at its collector to the anode of an SR 30 through a resistor 32, and the transistor 21 is connected at its collector to the cathode of an SR 29 through a resistor 31. The SR 30 is connected at its cathode to the anode of SR 29 through a variable resistor 33. The slide arm of variable resistor 33 is connected to one end of variable resistor 5 through a semi-fixed resistor 34, and the other end of variable resistor 5 is connected to the slide arm of variable resistor 5 through another semi-fixed resistor 35.

The Zener diodes 23 and 24 are provided to slice the power supply voltage for decreasing the difference between the power supply voltage and the voltage induced in the motor thereby facilitating the detection of the voltage induced in the motor, since the voltage induced in the motor is low compared with the power supply voltage applied across the motor in the conducting state of the bidirectional control element 11. Thus, the Zener diodes 23 and 24 act as a motor voltage detecting means. The capacitors 27 and 28 act to remove noise contained in the voltage induced in the motor so as to prevent erroneous operation of the transistors 21 and 22. The variable resistor 33 is provided to adjust the operating condition of the transistors 21 and 22. The semi-fixed resistor 34 is provided to cooperate with the transistors 21 and 22 to adjust the amount of feedback of the motor speed factor, and the semi-fixed resistor 35 is used for the fine adjustment of the current conduction phase of the bidirectional control element 11.

In operation, a main switch 3 is turned on to drive the motor at the speed determined by the setting of the variable resistor 5. Suppose now that the bidirectional control element 11 is not conducting in either direction, and a negative half cycle of the power supply voltage of A.C. power source 8 starts. Then, current supplied from the A.C. power source 8 flows to the field winding 2 through the terminal 10, main switch 3, resistor 6, variable resistor 5, semi-fixed resistor 35, capacitor 7, SR 17 and armature 1 in the above order. In this negative half cycle, the voltage induced in the motor is applied to the Zener diode 23 through the Zener diode 24 and resistor 36, and the terminal voltage of the Zener diode 23 is applied to the base of transistor 21 through the bias resistor 25 to turn on this transistor 21. Therefore, current supplied from the power source 8 flows, on the other hand, to the transistor 21 through the variable resistor 5, semi-fixed resistor 34, variable resistor 33, SR 29 and resistor 31 in the above order. This means that a series circuit consisting of the variable resistor 5, semi-fixed resistor 34, variable resistor 33, resistor 31 and transistor 21 is connected in parallel with the capacitor 7, and the bidirectional control element 11 is turned on with the current conduction phase determined by the terminal voltage of the parallel circuit consisting of the series circuit and the capacitor 7.

In the positive half cycle following this negative half cycle, current supplied from the A.C. power source 8 flows to the capacitor 7 through the terminal 9, SR 19, armature 1, field winding 2 and SR 16 in the above order. In this positive half cycle, the voltage induced in the motor is applied to the Zener diode 24, and the terminal voltage of the Zener diode 24 is applied to the base of transistor 22 through the bias resistor 26 to turn on this transistor 22. Current supplied from the power source 8 flows, on the other hand, to the variable resistor 5 through the SR 19, transistor 22, resistor 32, SR 30, variable resistor 33 and semi-fixed resistor 34 in the above order. This means that a series circuit consisting of the transistor 22, resistor 32, variable resistor 33, semi-fixed resistor 34 and variable resistor 5 is connected in parallel with the capacitor 7. Therefore, the bidirectional control element 11 is turned on with the current conduction phase determined by the terminal voltage of the parallel circuit consisting of the series circuit and the capacitor 7.

The rotating speed of the motor making stable constant-speed operation under a load of certain value will decrease when the load value increases. In such a case, the voltage induced in the motor is lowered in proportion to the rotating speed of the motor, and the terminal voltage of the Zener diodes 23 and 24, hence, the bias voltage applied to the transistors 21 and 22 is correspondingly lowered. Thus, the collector current is decreased, and this is equivalent to an increase in the resistance value of the transistors 21 and 22. As a result, the current conduction phase of the bidirectional control element 11 is advanced to increase the rotating speed of the motor. On the other hand, the rotating speed of the motor increases with a decrease in the load value, and the voltage induced in the motor increases in proportion to the rotating speed of the motor. Thus, the bias voltage applied to the transistors 21 and 22 is correspondingly increased for equivalently decreasing the resistance value of the transistors 21 and 22. As a result, the current conduction phase of the bidirectional control element 11 is retarded to decrease the rotating speed of the motor. It will thus be seen that the voltage induced in the motor, which voltage is variable depending on the load variation, is fed back to the bidirectional control element as the speed factor so that the motor can make the desired constant-speed operation in a very stable and reliable manner. The amount of speed factor feedback relative to the variation in the voltage induced in the motor can be freely adjusted by suitably selecting the Zener breakdown voltage levels of the Zener diodes 23 and 24, the resistance values of the bias resistors 25 and 26, and the resistance value of the feedback-controlling semi-fixed resistor 34.

While a preferred embodiment of the motor speed control system according to the present invention has been described in detail with reference to FIG. 2 by way of example, it is apparent that changes and modifications may be made therein without departing from the scope of appended claims. For example, the means for controlling current supplied to the motor may be a thyristor in lieu of the bidirectional control element illustrated in FIG. 2. Also, the motor voltage detecting means may be a neon discharge tube or the like in lieu of the illustrated Zener diode, and the switching means may be a thyristor or the like in lieu of the illustrated transistor. Modifications employing these elements are as effective as the specific embodiment in dealing with load variation.

We claim:

1. A speed control system for a motor comprising:
   a main motor circuit supplying motor current to the motor from an A.C. power source through a main switch and a semiconductor element provided with a control electrode;
   trigger voltage supplying means for supplying trigger voltage to the control electrode of said semiconductor element;
   zener diode means connected across said motor for detecting voltage induced in the motor; and
   automatically variable resistance means coupled to said zener diode means and having its resistance value automatically varied as a function of the voltage across said zener diode means;
   said trigger voltage supplied by said trigger voltage supplying means being controlled depending on the variation in the resistance value of said automatically variable resistance means, and
   the firing angle of said semiconductor element being retarded in response to an increase in said detected motor voltage and advanced in response to a decrease in said detected motor voltage.

2. A motor speed control system as claimed in claim 1, said automatically variable resistance means includes a transistor having its base and emitter connected across said zener diode means and its collector connected to said trigger voltage supply means which is biased by said detected motor voltage.

3. A motor speed control system as claimed in claim 2, wherein said trigger voltage supplying means includes a variable resistor whose one end is connected to said A.C. power source, a charging element connected to a sliding contact of said variable resistor, and a diode element connected between said charging element and said control electrode of said semiconductor element, said diode element being conducted when the charging voltage of said charging element reaches a predetermined value thereby supplying the trigger voltage to said control electrode, and the other end of said variable resistor being connected to the collector of said transistor, whereby the charging rate of said charging element is controlled in accordance with the conduction state of said transistor.

* * * * *